Figure 1:
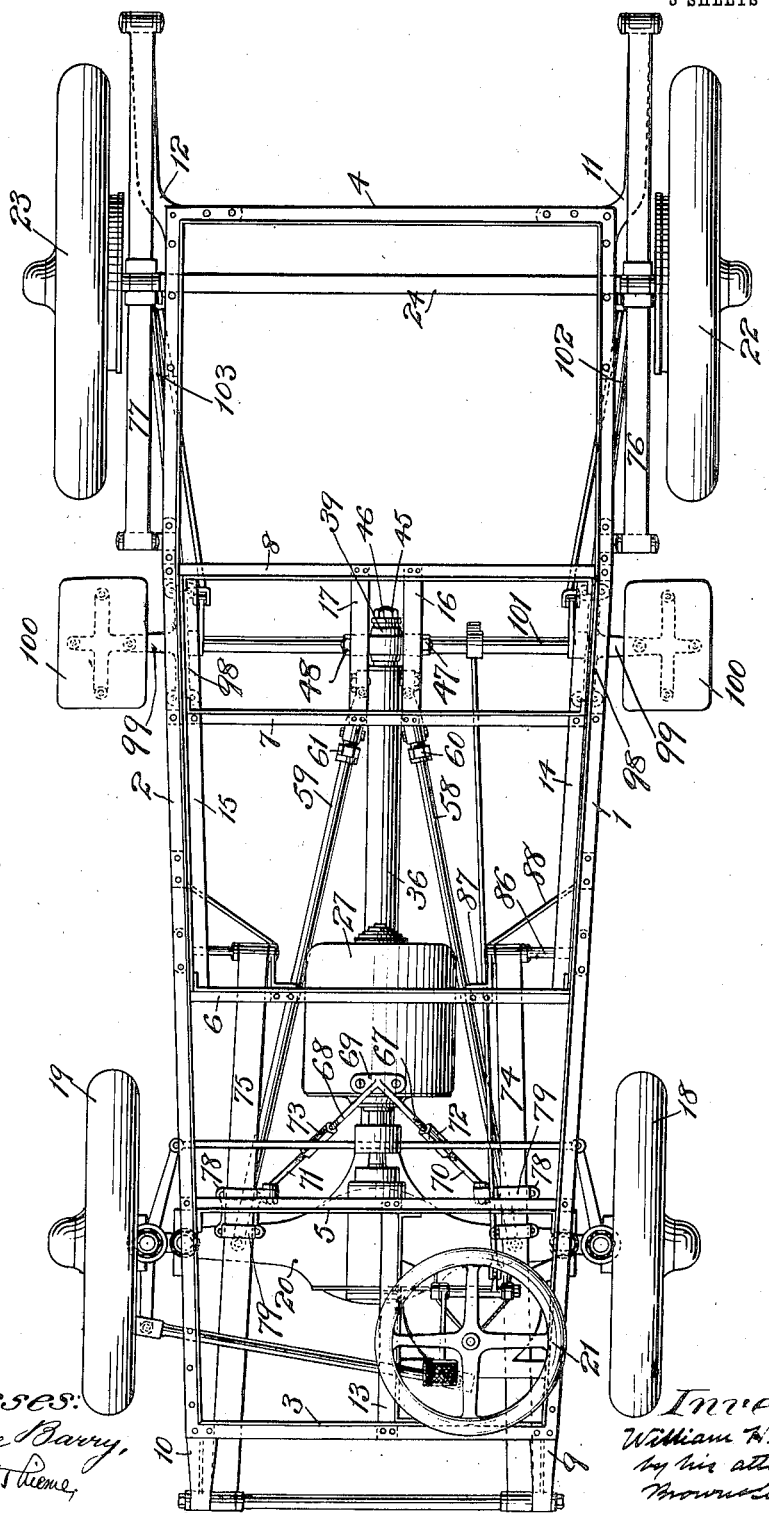

W. H. DOUGLAS.
MOTOR VEHICLE CHASSIS.
APPLICATION FILED OCT. 16, 1911.

1,115,413.

Patented Oct. 27, 1914.
3 SHEETS—SHEET 1.

Witnesses:
F. George Barry,
Henry C. Thieme,

Inventor
William H. Douglas
by his attorneys
Brown & Seward

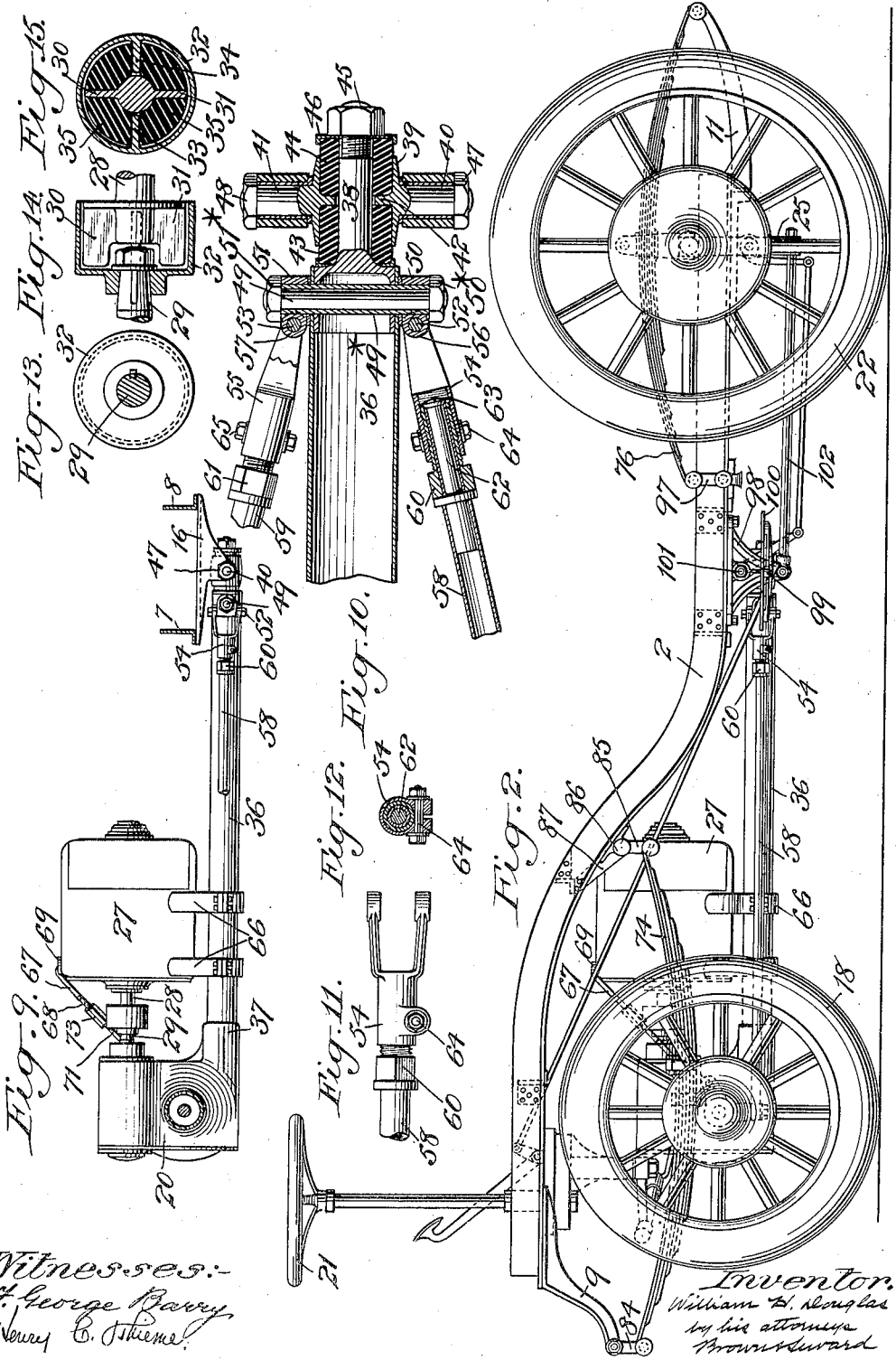

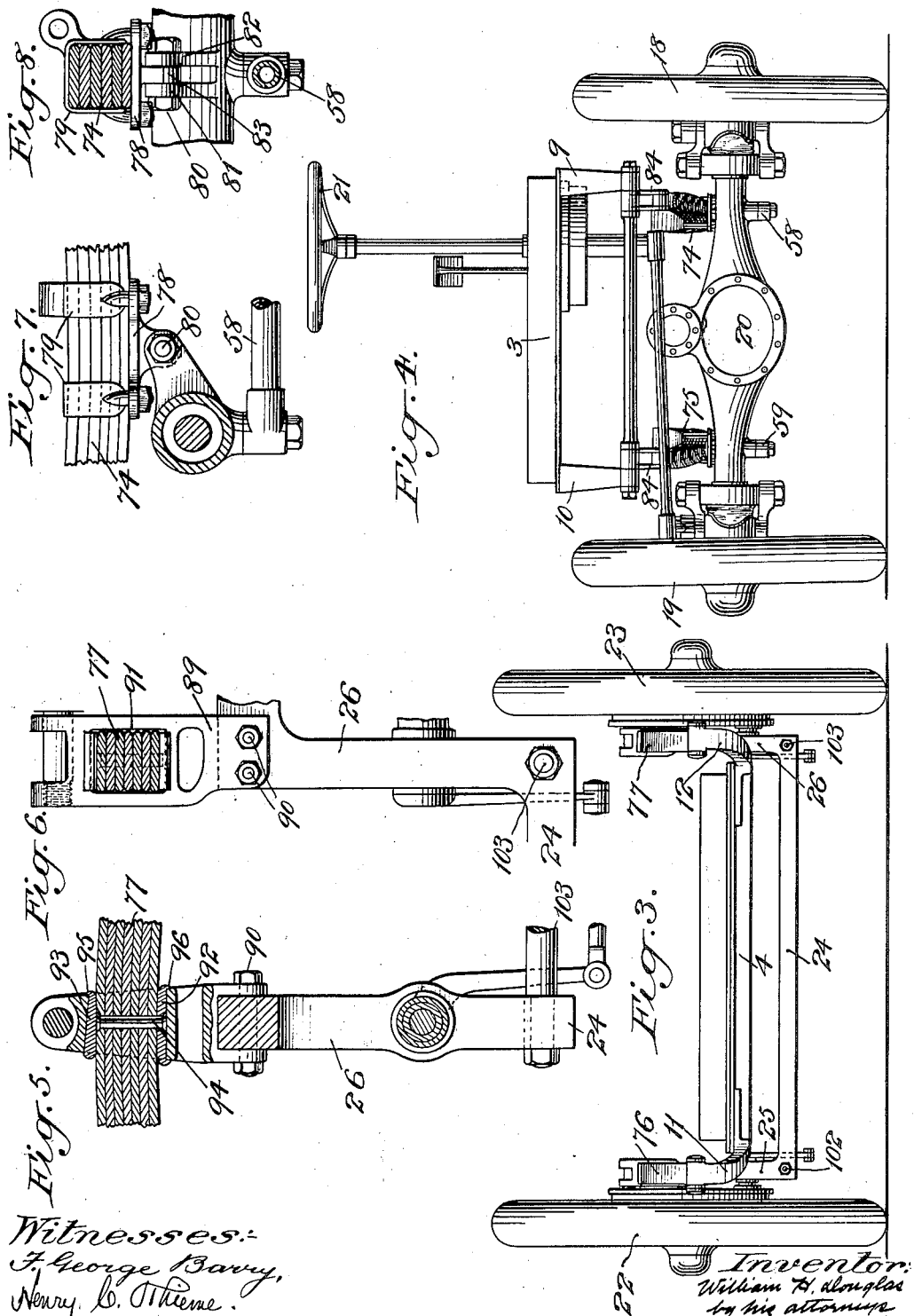

UNITED STATES PATENT OFFICE.

WILLIAM H. DOUGLAS, OF BELLEVILLE, NEW JERSEY, ASSIGNOR TO HEALEY & COMPANY, OF NEW YORK, N. Y., A CORPORATION OF NEW YORK.

MOTOR-VEHICLE CHASSIS.

1,115,413. Specification of Letters Patent. Patented Oct. 27, 1914.

Application filed October 16, 1911. Serial No. 654,996.

*To all whom it may concern:*

Be it known that I, WILLIAM H. DOUGLAS, a citizen of the United States, and resident of Belleville, in the county of Essex and State of New Jersey, have invented new and useful Improvements in Motor-Vehicle Chassis, of which the following is a specification.

This invention relates to improvements in motor vehicle chassis of that class in which the front steering traction wheels are driven from the motor.

This invention has for its objects to provide certain improvements in the construction, form and arrangement of the several parts whereby the noise incident to the operation of the vehicle and the wear upon the parts is obviated to a material degree and in which the structure is strengthened and simplified.

This invention consists more specifically in improvements in the frame; the motor arrangement; the motor support; the means for bracing the motor and its support; the arrangement of the vehicle springs and their connections with the frame and axles, and the common bracket support for the radius rods, brake shaft and steps.

A practical embodiment of my invention is represented in the accompanying drawings, in which—

Figure 1 represents the chassis of an electric motor driven vehicle of the front drive type, in top plan, embodying my improvements, Fig. 2 represents the same in side elevation, Fig. 3 is a rear end view of the chassis, Fig. 4 is a front end view of the same, Figs. 5 and 6 are detail sectional views taken at right angles to each other showing the manner of mounting the rear inverted semi-elliptic vehicle springs on the drop rear axle, Figs. 7 and 8 are detail sectional views taken at right angles to each other showing the manner of mounting the front semi-elliptic vehicle springs on the front axle housing, Fig. 9 is a detail sectional view showing the manner of mounting the motor, Fig. 10 is an enlarged detail sectional view showing the resilient means for securing the rear end of the motor supporting bar to the frame and the means for adjusting the side braces for said bar, Fig. 11 is a detail side view of the adjustable means for attaching the rear end of the side braces to the rear end of the motor supporting bar, Fig. 12 is a cross sectional view taken in the plane of the line A—A of Fig. 11, and Figs. 13, 14 and 15 are different detail views showing the yielding driving connection between the motor shaft and the worm shaft.

The frame comprises the side bars 1, 2, and cross bars 3, 4, intermediate cross bars 5, 6, 7, 8, front side extension arms 9, 10, rear side extension arms 11, 12, intermediate longitudinal bar 13, extending between cross bars 3 and 5, intermediate longitudinal bars 14, 15, extending from cross bar 6, to cross bar 8, along the sides of the bars 1, 2; and a pair of intermediate longitudinal bars 16, 17, extending between the cross bars 7, 8. The forward portion of the frame is elevated and the rear portion of the frame is depressed, the front side extension arms 9 and 10 being extended downwardly and forwardly and the rear side extension arms 11, 12, being extended upwardy and rearwardly.

The front traction wheels are denoted by 18, 19, the axle for which is inclosed in a front axle housing 20. These wheels are steered from the steering wheel 21 through suitable connecting parts of well known and approved form, a specific description of which will not be made herein.

The rear traction wheels are denoted by 22, 23, and they are suitably mounted upon a rear drop axle 24, the uprising vertical branches of which are denoted by 25, 26. The motor is denoted by 27 and it is herein shown as an electric motor.

The motor shaft 28 drives a worm shaft 29 through a yielding connection such as that shown in detail in Figs. 13, 14 and 15, in which the motor shaft is provided with wings 30, 31, and the worm shaft 29 is provided with a casing 32 having inwardly extended wings 33, 34, alternating with the motor shaft wings 30, 31. Blocks of rubber or other resilient material 35 are interposed between the alternating wings 30, 31, 33, 34, of the motor and worm shafts 28, 29.

The driving connection between the worm shaft 29 and the front axle for driving the front traction wheels 18, 19, will not be described herein as it forms the subject matter of a co-pending application.

The motor supporting bar 36 is permanently and rigidly secured at its front end within a lug 37 projecting rearwardly from the front axle housing 20. The rear end of this motor supporting bar 36 is resiliently supported from the frame by the following means:—A bolt 38 projects rearwardly from the inner end of the bar 36 through a sleeve 39 having laterally arranged lugs 40, 41, projecting from its opposite sides through the depending portions of the intermediate longitudinal bars 16, 17. This sleeve 39 is further provided with a centrally arranged interior annular flange 42 spaced a short distance from the bolt 38 so as to permit a slight lateral movement of the bolt within the said sleeve. Yielding cushioning rings 43, 44, surround the bolt 38 upon opposite sides of the interior annular flange 42 for yieldingly holding the bolt 38 centered with respect to the sleeve 39. A nut 45 engages the screw threaded end of the bolt 38 for holding the parts in their assembled position. A washer 46 is preferably inserted between the yielding block 44 and the nut 45. Nuts 47, 48, engaging the screw threaded ends of the lugs 40, 41, serve to secure the bars 16, 17, to said lugs. These rings 43, 44, serve to permit a slight twisting motion of the bar. They also absorb the longitudinal shocks of the bar in both directions as well as permitting the slight lateral movement of the bar in all directions.

The adjustable diagonal side braces for the motor supporting bar 36 are constructed and arranged as follows:—A bolt 49 and lining 49* are inserted laterally through the rear end of the bar 36 and enlarged end of the bolt 38 and the bolt is provided exterior to said bar upon both sides thereof with collars 50, 51, held in position by the nuts 50*, 51*, on the ends of said bolt 49. Vertically arranged bolts 52, 53, pass through the bifurcated ends of split sleeves 54, 55, and intermediate lugs 56, 57, on the collars 50, 51. The front ends of the diagonal side braces 58, 59, are bolted to the under side of the front axle housing 20 upon opposite sides of the front end of the bar 36. The rear ends of these side braces are adjustable in the split sleeves 54, 55, by providing the braces with nuts 60, 61, having their shanks screw threaded into the split sleeves 54, 55. These nuts are held against longitudinal movement on the the ends of their braces by providing each of said braces with a pin 62 having its inner end 63 spread to engage the rear end of the shank of each nut. Clamping bolts 64, 65, are provided for locking the nuts 60, 61, against movement when the braces 58, 59, have been adjusted to the proper tension.

The motor 27 is supported on the bar 36 by straps 66 and it is held against any lateral movement on said bar by diagonal adjustable braces as follows: Two rods 67, 68, project downwardly and forwardly at about right angles to each other from a plate 69 secured on the top of the motor casing. Two rods 70, 71, extend upwardly and rearwardly from the means for clamping the front vehicle springs to the front axle housing, in alinement with the rods 67, 68, and couplings 72, 73, engage the adjacent screw threaded ends of said rods for adjusting their tension.

The front pair of vehicle springs are denoted by 74, 75 and the rear pair of vehicle springs are denoted by 76, 77. These springs are shown as of the semi-elliptic type and the rear pair of springs are shown as inverted. The front springs converge from their front to their rear ends so as to permit the steering traction wheels 18, 19, to be swung to a greater angle with respect to the vehicle than would be possible where the springs were parallel with the vehicle, thus permitting the vehicle to turn in a shorter circle. These front vehicle springs 74, 75, are mounted intermediate their ends on the front axle housing 20 as follows: Each spring has its clip plate 78 to which its clips 79 are secured, pivoted at 80 to the front axle housing, in the present instance by providing the housing with a pair of lugs 81, 82, and the plate with a lug 83 interposed between the lugs 81, 82, and passing the pivot bolt 80 through the three lugs. Each front spring is thereby pivoted to its support. The front end of each of these front vehicle springs is attached to its respective extension arm 9, 10, through a link 84 and the rear end of each of these front vehicle springs is connected to the frame through a link 85 suspended from a short cross bar 86 projecting inwardly from each side bar 1 and 2 and supported at its inner end by a bracket 87. A diagonal brace 88 may lead from this bracket 87 to its respective side bar 1 and 2.

The pair of inverted rear vehicle springs 76, 77, are mounted intermediate their ends on the rear axle 24 as follows:—A bracket 89 uprises from each upward branch 25, 26, of the drop axle, which bracket is secured at 90 by suitable bolts. Each bracket has a hole 91 through which the several leaves of the spring extend. The hole 91 is of the same width as the spring but is sufficiently long to admit the insertion of a metal bottom plate 92 and top wedge plate 93 for locking the spring to the bracket. The bottom plate 92 is preferably riveted together with the leaves of the springs by the rivet bolt 94. After the wedge plate 93 has been driven home, its smaller end is upset as shown at 95 and the opposite ends of the bottom plate 92 are upset as shown at 96 to overlap the top and bottom walls of the hole 91, for absolutely preventing any longitudinal movement of the spring within the bracket. The rear ends of these springs 76, 77, are pivoted to the free ends of the rear extension arms 11, 12, and the front ends of these springs are connected to the side bars 1 and 2 at the depressed portion of the frame by links 97.

Hanging brackets 98 are secured to the side bars 1 and 2 and intermediate longitunal bars 14, 15, which brackets have outwardly extended arms 99 to which steps 100 are secured. These brackets also support the ends of a cross rock shaft 101 of the brake mechanism. The forward ends of the radius rods 102, 103, are secured to these brackets 98 and the rear ends of these radius rods are secured to the rear drop axle 24 for tying the rear axle to the frame against longitudinal movement with respect thereto.

From the above description it will be seen that a chassis construction is provided in which the shape of the frame permits the ready mounting of a landaulet body thereupon, the reversing of the arrangement of the front and rear springs permitting the use of a frame having a raised forward and depressed rearward portion. It will also be seen that the provision of convergent front springs permits the motor driven steering traction wheels to be turned at a greater angle with respect to the frame thereby permitting the car to be turned in a very short space. It will also be seen that by supporting the motor upon a bar rigidly secured to the front axle housing and properly bracing said motor, it is impossible for the motor and worm gear shafts to become out of alinement. The yielding or resilient connection of the rear end of the motor supporting bar with the frame eliminates both noise and jar at this point.

By pivotally mounting the front springs on the front axle housing, the springs are more readily permitted to adjust themselves without any undue strain upon the housing or themselves. The mounting of the rear springs upon brackets secured to the drop rear axle materially cheapens the construction of the axle and, at the same time, permits the ready insertion and removal of the springs without affecting the axle itself. It will also be noticed that the brackets for supporting the steps also serve as supports for the intermediate brake rock shaft and for the forward ends of the radius rods.

It is evident that various changes might be resorted to in the form, construction and arrangement of the several parts without departing from the spirit and scope of my invention; hence I do not wish to limit myself strictly to the structure herein set forth, but

What I claim is:—

1. In a motor vehicle, a chassis frame diverging from front to rear having an elevated front portion and a depressed rear portion, converging upwardly directed front springs located below the elevated front portion of the frame and downwardly directed rear springs located above the depressed rear portion of the frame.

2. In a motor vehicle, a chassis frame diverging from front to rear having an elevated front portion and a depressed rear portion, converging upwardly directed front semi-elliptic springs located below the elevated front portion of the frame and downwardly directed rear semi-elliptic springs located above the depressed rear portion of the frame.

3. In a motor vehicle, a chassis frame diverging from front to rear having an elevated front portion and a depressed rear portion, a front axle housing, a rear axle, converging upwardly directed front springs located below the elevated portion of the frame and connecting it to the front axle housing and downwardly directed rear springs located above the depressed rear portion of the frame and connecting it to the rear axle.

4. In a motor vehicle, a chassis frame diverging from front to rear having an elevated front portion and a depressed rear portion, a front axle housing, a rear axle, converging upwardly directed front semi-elliptic springs located below the elevated portion of the frame and connecting it to the front axle housing and downwardly directed semi-elliptic rear springs located above the depressed rear portion of the frame and connecting it to the rear axle.

5. In a motor vehicle, a chassis frame having an elevated front portion and a depressed rear portion, front springs located below and within the sides of the elevated front portion of the frame and rear springs located above and exterior to the sides of the depressed rear portion of the frame.

6. In a motor vehicle, a chassis frame having an elevated front portion and a depressed rear portion, front springs located below and within the sides of the elevated front portion of the frame and rear springs located above and exterior to the sides of the depressed rear portion of the frame, said front springs being convergent from front to rear to permit the steering traction wheels to be turned to a greater angle with respect to the frame than if the springs were parallel with the frame.

7. In a motor vehicle, a chassis frame diverging from front to rear, having an elevated front portion and a depressed rear portion, the elevated front portion having downwardy projecting front extension arms, a front axle housing, and converging upwardly directed front springs having their front ends connected to said arms, their rear ends to the elevated portion of the frame and their intermediate portions to the front axle housing.

8. In a motor vehicle, a chassis frame diverging from front to rear having an elevated front portion and a depressed rear portion and upwardly projecting rear extension arms, a rear axle and downwardly directed rear springs having their rear ends connected to said arms, their front ends to the depressed portion of the frame and their intermediate portions to the rear axle.

9. In a motor vehicle, a chassis frame diverging from front to rear, a rear drop axle, brackets having holes therethrough, said brackets projecting above and secured to the uprising portions of the axle and rear springs passing through said holes in the brackets and connected at their ends to the frame and intermediate their ends to said brackets.

10. In a motor vehicle chassis, an axle, brackets having holes therethrough and secured to said axle, springs extending through said holes in the brackets and wedges adapted to enter said holes in the brackets for locking the springs to the brackets.

11. In a motor vehicle chassis, a drop rear axle, brackets having holes therethrough secured to and uprising from the elevated portions of said axle and rear vehicle springs extending through said holes and secured to said brackets.

In testimony, that I claim the foregoing as my invention, I have signed my name in presence of two witnesses, this 9th day of October 1911.

WILLIAM H. DOUGLAS.

Witnesses:
F. GEORGE BARRY,
OTTO W. HOLMGREN.